United States Patent Office 3,207,693
Patented Sept. 21, 1965

3,207,693
TREATMENT OF WELLS
Arnold J. Morway, Clark, and Albert J. Bodner, Linden, N.J., assignors to Esso Research and Engineering Company, a corporation of Delaware
No Drawing. Filed Dec. 14, 1961, Ser. No. 159,438
6 Claims. (Cl. 252—8.55)

This invention relates to operations performed in wells. More particularly, this invention relates to the treatment of fluids, such as hydraulic fracturing fluids, used in fracturing subsurface formations to increase or initiate the production of oil from the fractured formations.

If a well has oil to produce and sufficient reservoir pressure to flow the oil to any fractures, additional oil can be produced as a result of fracturing.

Well fracturing is the splitting of rock by pressure. Hydraulic pressure applied to the rock of the well bore creates compressive and tensile forces around the hole. When these forces become great enough, they force the rock apart and start the split which is lengthened by the fluid pumped into the hole.

A good fracturing fluid must have, among other things, the following characteristics:

(1) It must be fluid enough to be easily pumped by the usual well completion pumps.

(2) It must be capable of holding a propping material, such as sand, in suspension while being pumped down the well; but it also must be capable of depositing the propping material in the cracks of the formation.

(3) It must flow into the cracks in the formation, but there should be a minimum of fluid loss into the pores.

(4) It must not plug the pores of the formation permanently, or the capacity of the formation to produce oil will be damaged.

Some lease oils and some refined crudes, without the addition of agents thereto, possess enough of the desired characteristics to permit their use as fracturing fluids under some conditions. Some oils do not cause serious damage to the formation. However, in order to use these lease oils and refined crude oils, the pump rate necessary to keep the sand or other propping material in suspension must be very high. These high pump rates are often impossible because of the limitations of available pumping units. This is particularly so when pumping through tubing or small diameter casing. Such tubing and small diameter casing are found in various kinds of wells as, for example, the permanent well completion-type well wherein a tubular member is permanently placed within the well with its lower extremity located above the bottom of the well. Thus, most oils require the addition of one or more agents to achieve the desired results.

A good fracturing fluid must be easily pumped down the well as formerly explained. A good fracturing fluid must also be capable of holding a propping material, such as sand, in suspension while being pumped down the well. This fracturing fluid must deposit the sand in the cracks of the formation to hold the cracks open. In general, the higher the viscosity of the fracturing fluid, the better the fluid is for purposes of sand suspension. The higher viscosity fracturing fluid tends to hold the sand in suspension as the fracturing fluid is pumped into the well. The reason for holding the sand in suspension is to prevent the sand from settling into the bottom portion of the resulting fracture. Also, a good sand suspending fracturing fluid prevents the sand from bridging across the fracture. If no bridging of the sand occurs or the sand does not settle to the bottom of the fracture, a longer fracture is obtained and a better propping of the fracture. Unfortunately, however, if a high viscosity fracturing fluid is used because of its better sand suspension and antibridging capacity, the power requirement of the pumps is higher than the power requirement of the pumps if a low viscosity fluid is used. With high viscosity fracturing fluids, the effective power at the depth at which fracturing is to be made is much less than the input power at the wellhead. With low viscosity fracturing fluids, the effective power at the place of fracture is substantially the same as the input power at the wellhead. This feature is highly important when it is understood that the pressure required to make a fracture in the formations having oil is approximately one pound per square inch for each foot of depth. Hence, if a fracture is to be made at a depth of 10,000 feet or greater, the effective pressure at the place of fracture must be at least about 10,000 pounds per square inch.

A good agent for a fracturing fluid provides a low resistance to flow as the fluid is being pumped into the well and thus acts as a low viscosity fluid, yet provides sufficient strength to hold the propping material, such as sand, in suspension as the fluid is being pumped into the well and the fracture thus acting in this capacity as a high viscosity fracturing fluid.

In addition to being easily pumpable and capable of holding the propping material in suspension, a good fracturing fluid must also flow into the cracks as they are formed but must not flow into the pores. Flow into the pores of the fracture results in wasted fluid since high fluid loss into the pores leaves less fluid available for extending the fracture. A low fluid loss into the pores leaves more fluid available for extending the fracture. The longer and more extensive the fractures, the greater will be the productive capacity of the well when returned to production.

The amount of fluid loss into a formation, using a particular agent or additive, is of extreme importance. An additive providing low fluid loss permits a longer and more extensive fracture. This results in more productive capacity of the well then returned to production. Hence, workers skilled in the art are continuously looking for an additive and fracturing fluid which permit a minimum of fluid loss into the pores of the subsurface formation.

A still further requirement is that the pores must not be plugged permanently, or the capacity of the formation to produce oil when the well is returned to production will be damaged.

Many types of fracturing fluids and additives possess all the desirable features heretofore mentioned. However, it has been found that in many of these fracturing fluids or additives if a certain amount of water is present in the fracturing fluids or additives, they lose some of their desirable properties. Specifically, the fluid loss of fluids into the pores of the fractured formation is increased to an undesirable extent. Accordingly, it is necessary to use a clean (all water removed) crude oil or a clean refined oil as a portion of the fracturing fluid.

Usually, a lease or crude oil is used as the main constituent of the fracturing fluid. Often from about 0.5 percent to 2 percent of the lease oil or crude oil consists of water. Hence, it would be highly desirable to provide the art with a fracturing fluid and fracturing fluid additive which possess all of the aforementioned desirable properties and are water insensitive.

Through intensive studies, experiments, and tests, we have invented a new combination of constituents to provide the art with a fracturing fluid additive and fracturing fluid which possess all of the aforementioned properties and at the same time are insensitive to the amount of water normally expected in a lease or crude oil.

Briefly described, our invention comprises an additive for use in well operations which includes a major portion of a petroleum oil. A small portion of a metal salt-metal soap complex is included in the additive. Also included as a part of the additive is a minor portion of a polyacrylic acid.

The metal salt-metal soap complex is made by heating and mixing various materials together including a low molecular weight organic acid and a saponifiable acid of high molecular weight. We have found that though the additive containing the polyacrylic acid provides a very low fluid loss when added to a fracturing fluid, the fluid loss is even further decreased by providing a mol ratio of low molecular weight organic acid to saponifiable acid ranging from 40/1 to 100/1 and preferably 60/1.

In preparing the metal salt-metal soap complex, a basically reacting metal compound is reacted with the low molecular weight acid and the saponifiable acid. We have found that a still lower fluid loss is obtained using this additive with a fracturing fluid if the basically reacting metal compound used in forming the metal salt-metal soap complex is more than the amount required to neutralize the acids to provide an excess base ranging from 1.0 percent to 10.0 percent.

A new and improved fracturing fluid comprising our invention is obtained by adding the additive to a hydrocarbon carrier fluid such as a lease or crude oil found in the vicinity of the wells having the formations it is desired to fracture.

The metals used in forming the salt-soap complexes are preferably selected from the alkaline earth metals, barium, calcium, and strontium. However, aluminum, beryllium, zinc, cadmium, boron, tin, zirconium, cerium, vanadium, antimony, bismuth, arsenic, copper, molybdenum, germanium, columbium, chromium, selenium, tellurium, tungsten, manganese, iron, cobalt, or nickel may be used under particular circumstances. The complexes are not limited to those containing a single metal but instead a given complex may contain two or more of the above-listed metals. The salt and the soap may be formed of the same metal, or the salt may be formed from one metal and the soap from another metal.

The preferred salt-soap complex employed in this invention is a calcium acetate-calcium soap complex.

The salts useful in forming these complexes are preferably simple reaction products resulting from the combination of an organic acid of a relatively low molecular weight with a metal oxide or metal hydroxide. Suitable organic acids of low molecular weight whose salts may be employed for formation of complexes include monocarboxylic and polycarboxylic acids containing less than 7 carbon atoms per molecule. Included in this group are formic, acetic, propionic, butyric, valeric, oxalic, malonic, succinic, the low molecular weight alkyl and arylsulfonic acids, the low molecular weight carboxylic acids such as glyceric, glycolic, and thioglycolic.

The high molecular weight saponifiable organic acids may include fatty acids, either in a combined or a free state, tallow, lard, oil, hog fat, horse fat, stearic acid, oleic acid, higher molecular weight acids resulting from the oxidation of petroleum fractions, rosin and related products, higher molecular weight naphthenic acids, sulfonic acids, and saponifiable waxes such as beeswax, sperm oil, and degras. Irrespective of the source of the high molecular weight organic acid used as the soap portion of the complex, the said organic acids should contain not less than 7 carbon atoms per molecule and not more than about 30 carbon atoms per molecule and preferably should contain between 8 and 18 carbon atoms per molecule.

A preferred complex was prepared in a mineral distillate in the following manner using the components listed below in the amount shown.

EXAMPLE I

| Ingredients | Weight percent |
| --- | --- |
| Acetic anhydride | 20.0 |
| Crude tall oil | 2.2 |
| Hydrated lime | 16.0 |
| Calcium carbonate | 5.0 |
| Phenyl α naphthylamine | 0.5 |
| Polyacrylic acid | 3.0 |
| Naphthenic-type mineral oil distillate having a viscosity of 55 SSU at 250° F. | 53.3 |

*Preparation.*—Charged mineral oil, calcium carbonate, hydrated lime and tall oil to a steam heated kettle and intimately mixed. Then slowly added the acetic anhydride. The temperature of reaction rising to 200° F. Continued heating (externally) to 320° F. Cooled to 200° F. Added phenyl α naphthylamine and cooled to 100° F. Added polyacrylic acid and mildly milled. Percent free alkalinity calculated as NaOH—2.6.

The mineral oil charged to the heated kettle is preferably a naphthenic-type mineral oil or aromatic oil having a viscosity of less than 75 SSU at 210° F. which acts as a dispersant for the complexes. However, a paraffinic oil may be used if desired. Synthetic oils may be used including diesters, complex esters, silicone oils, etc. The amount of oil may range between 40 percent to 80 percent by weight.

The organic metal salt-metal soap complexes which are dispersed in a naphthenic-type mineral oil or other petroleum fluid can be made to vary in fluidity from a very fluid compound to a highly viscous compound by those skilled in the art. The compound may not be in convenient form for use in the field, particularly if it is highly viscous. Hence, a feature of the invention described herein is a composition used as an additive and includes the calcium salt-calcium soap complex formed by any convenient manner such as described above, a petroleum oil, and polyacrylic acid.

The complex material, the petroleum oil, and the polyacrylic acid are thoroughly mixed together to form the additive. The additive is mixed until the desired fluidity is obtained. The petroleum oil may be either a crude oil or refined oil.

The preferred petroleum oil used in the additive is preferably a distillate or fracture from a distillate such as a distillate extract. Its viscosity should be in the range of 100 to 1,000 SSU/100° F. The preferred oil is a phenol extract of a distillate from Coastal crude. Its viscosity is about 145 SSU/100° F. Mixing can be accomplished by a simple mixing in a drum with a Lightnin mixer, by circulating with a pump, or by means of a colloidal mill. The finally prepared additive consists preferably of a calcium acetate-calcium soap complex ranging from about .25 percent to 15 percent by weight of the additive and polyacrylic acid ranging from about 0.01 percent to 2.0 percent by weight of the additive.

The additive can be placed in containers such as cans suitable for holding fluids. Our new additive for use in well operations can then be added when desired to a lease crude at the well site or to refined oils and other fracturing fluids which have been transported to the well site. For example, the additive described above may be used by mixing the required amount into the fracturing fluid to be employed. The amount of additive used is preferably such that the final concentration of the additive in the fracturing fluid is in the range of from 0.01 percent to 8 percent by volume of the hydrocarbon carrier fluid. The actual amount required depends upon the fluid being used and can be initially determined by a laboratory test. The test used for this determination is the API Code No. 29, Fourth Edition, May 1957, "Fluid Loss Test."

The polyacrylic acid is preferably a very high molecular weight polyacrylic acid. The molecular weight is at least 200,000. This high molecular weight polyacrylic acid is initially in the form of a fluffy white acid powder and is a hydrophilic polymer.

An additive was prepared by mixing a metal salt-metal soap complex prepared with the ingredients and amounts shown in Example I with a phenol extract. The final composition of the additive consisted of about 30 percent of the material prepared in the manner described above and 70 percent of the phenol extract. A fracturing fluid was prepared by adding a small precentage of additive to a phenol extract petroleum oil. The final composition of the finished fracturing fluid was about 1 percent by weight additive and 99.0 percent by weight hydrocarbon carrier fluid.

The fracturing fluid prepared in the manner described above was tested under varying conditions to determine the amount of fluid loss. A fluid loss of more than 30 ml. in 30 minutes is considered poor. A fluid loss of less than 30 ml. is considered satisfactory. Of course, the less the fluid loss, the better are the fluid loss properties of the fracturing fluid. The results of these tests are shown in Table I.

*Table I*

API RP-29 CODE FILTRATION TESTS

Test conditions:

Duration—30 minutes
Quantity—250 ml.
Temperature—100° F.
Pressure—100 p.s.i.g.
Filter paper—Whatman #50

Fracturing fluid dry: Filtrate, ml. after 30 min.
  Without polyacrylic acid _____ 7.0
  With polyacrylic acid _____ 4.0

Wet—1.0 percent of a 2 percent NaCl adqueous solution dispersed in fluid:
  Without polyacrylic acid _____ 200.0
  With polyacrylic acid _____ 17.0

An examination of Table I shows that the fracturing fluid in a "dry" condition had a fluid loss of 7.0 ml. without the addition of polyacrylic acid. This is satisfactory. However, with the addition of polyacrylic acid, the fluid loss of the "dry" fracturing fluid was reduced to 4.0 ml.

An examination of Table I shows further that with "wet" fracturing fluid, i.e., a small amount of water was present, the fluid loss was 200 ml. without the addition of polyacrylic acid. This amount of fluid loss would make the fracturing fluid useless for fracturing operations. However, with the addition of the small amount of polyacrylic acid, the fluid loss of the "wet" fracturing fluid was reduced to only 17 ml. These tests, therefore, conclusively prove that the polyacrylic acid reduces the water sensitivity of a fracturing fluid.

A material containing the calcium salt-calcium soap complexes was made from the ingredients and the amounts shown in Example II.

EXAMPLE II

| Ingredients | | Weight Percent |
|---|---|---|
| Acetic anhydride | | 30.0 |
| Emery fatty acid (commercial iso-oleic acid) | 97 Percent | 2.9 |
| Hydrated lime | | 23.0 |
| Phenyl α naphthylamine | | 1.0 |
| Naphthenic-type mineral oil | | 43.1 |
| Polyacrylic acid | 3 Percent | |

*Preparation.*—Charged the mineral oil, Emery fatty acid, and lime to a steam jacketed kettle and intimately mixed. Without external heating, charged acetic anhydride slowly while stirring. Temperature rose to 198° F. Continued mixing and heated to 320° F. Then cooled while stirring to 200° F. Added phenyl α naphthylamine and cooled further to 100° F. Then Morehouse milled. The polyacrylic acid was added as a white powder and incorporated.

The above-formed calcium salt-calcium soap complex material is added to a major portion of a petroleum oil to form the additive. For example, 30 percent of the material containing the complex may be added to 70 percent of a petroleum oil such as a phenol extract.

A small amount of additive is added to the petroleum oil employed to fracture the well. The petroleum oil may be a refined mineral oil or a crude or lease oil.

A series of tests was made on fracturing fluids incorporating material having the calcium salt-calcium soap complexes similar to Example II but of different mol ratios. The results of these tests are shown in Table II.

*Table II*

FRACTURING FLUID WITH HIGH MOL RATIO CALCIUM ACETATE FRACTURING ADDITIVES

| Mol Ratio | 20/1 | 40/1 | 50/1 | 100/1 | 200/1 | 500/1 |
|---|---|---|---|---|---|---|
| Formulation (percent weight): | | | | | | |
|   Acetic anhydride | 20.0 | 25.0 | 30.0 | 30.0 | 25.00 | 30.00 |
|   Emery fatty acid (commercial iso-oleic acid) | 5.6 | 3.6 | 2.9 | 1.7 | 0.73 | 0.35 |
|   Hydrated lime | 16.2 | 19.4 | 23.0 | 22.8 | 18.50 | 22.40 |
|   Phenyl α naphthylamine | 1.0 | 1.0 | 1.0 | 1.0 | 1.00 | 1.00 |
|   Naphthenic-type mineral oil distillate having a viscosity of 55 SSU at 250° F | 57.2 | 51.0 | 43.1 | 44.5 | 54.77 | 46.25 |
| Filtrate in 30 min.—in API RP-29 Code Test:[1] | | | | | | |
|   Without polyacrylic acid | 5.0 | 3.0 | 3.0 | 7.0 | 15.0 | 22.0 |
|   With polyacrylic acid (1%) | 5.0 | 3.0 | 3.0 | 7.0 | 15.0 | 22.0 |
|   And 2.5% salt water (2% Salt) | 29.0 | 21.0 | 18.0 | 18.0 | 26.0 | 22.0 |
|   Without polyacrylic acid and 2.5% salt water (2% Salt) | All filter through readily—no apparent plugging | | | | | |

[1] The above products were compounded with a phenol extract (30% product) + 70% phenol extract as the major portion of petroleum oil with and without polyacrylic acid and then added 2.5% concentrates to oil to form the fracturing fluid—wet and dry.

Table II shows that the fluid loss of the final fracturing fluid is related to the mol ratio of the low molecular weight organic acid with respect to the saponifiable higher molecular weight acid. It further shows that in the range of from about 40/1 to 100/1, the fluid loss is at a minimum. Table II further shows that if a small amount of salt water is included in the fracturing fluid, the fluid filters readily if no polyacrylic acid is present in the fracturing fluid. However, the addition of the polyacrylic acid provides a suitable fracturing fluid even in the presence of salt water. Even with salt water a minimum amount of fluid loss results from a 40/1 to 100/1 ratio of low molecular weight organic acid to saponifiable higher molecular weight acid.

It has been shown that the addition of a small amount of polyacrylic acid to a fracturing fluid additive decreases the water sensitivity of the final fracturing fluid product. It has also been shown that a mol ratio of low molecular weight organic acid to saponifiable acid ranging from 40/1 100/1 further improves the fluid loss characteristic of the fracturing fluid. We have found further that an improved fracturing fluid additive and improved fracturing fluid final product can be obtained by overbasing the materials used to form the compound containing the salt-metal soap complex.

In the formation of the overbased "complex" material, a mixture of hydrated lime and calcium carbonate is employed in excess over that required to neutralize the acids. The finished "complex" material provides excess base ranging from 2.0 percent to 8.0 percent.

Example III and Example IV are examples of fracturing fluids formed by adding an additive to a hydrocarbon carrier fluid, which additive includes a thickening material having a metal salt-metal soap complex prepared by reacting a basically reacting metal compound with the low molecular weight acid and the saponifiable higher molecular weight acid. The amount of basically reacting metal compound used was more than the amount required to neutralize the acid so as to provide an excess base.

EXAMPLE III

| Ingredients | Weight Percent | | |
|---|---|---|---|
| Acetic anhydride | 30.0 | | |
| Emery fatty acid (commercial iso-oleic acid) | 2.9 | | |
| Hydrated lime | 23.0 | | |
| Calcium carbonate | 4.0 | 30.0% | |
| Phenyl α naphthylamine | 0.3 | | 1.0% |
| Polyacrylic acid | 3.0 | | |
| Naphthenic-type mineral oil | 36.8 | | |
| Hydrofined phenol extract | 70.0 | | |
| Hydrocarbon carrier fluid | | | 99.0% |

Percent free alkalinity of "complex" material—2.0 (Calculated as NaOH).

EXAMPLE IV

| Ingredients | Weight Percent | | |
|---|---|---|---|
| Glacial acetic acid | 10.0 | | |
| Coconut fatty acid | 5.0 | | |
| Hydrated lime | 8.3 | | |
| Calcium carbonate | 4.0 | 30.0% | |
| Phenyl α naphthylamine | 0.5 | | 1.0% |
| Polyacrylic acid | 3.0 | | |
| Naphthenic-type mineral oil | 69.2 | | |
| Hydrofined phenol extract | 70.0 | | |
| Hydrocarbon carrier fluid | | | 99.0% |

Percent free alkalinity of "complex" material—2.56 (Calculated as NaOH).

In Example III, acetic anhydride was used as the low molecular weight acid and commercial iso-oleic acid was used as the saponifiable acid. In Example IV, glacial acetic acid was used as the low molecular weight acid and coconut fatty acid as the saponifiable acid. In each example, 30 percent by weight of the thickening material and 70 percent by weight of the hydrofined phenol extract were combined to form our new additive. The resulting additive was added in the amount of 1 percent to the hydrocarbon carrier fluid to form the final fracturing fluid.

Tests were made on the fracturing fluids of Example III and Example IV in the "wet" condition. A 1 percent of a 2 percent NaCl solution was added to the fracturing fluid for these tests. The results of the filtration tests are shown in Table III.

Table III

API RP-29 CODE FILTRATION TESTS
(1.0% SALT WATER)

[1.0% additive employed in fracturing fluid. Fracturing fluid also contained 1% of 2% NaCl solution.]

| Additive: | Wet filtrate, ml. |
|---|---|
| Example III without polyacrylic acid | 70+ |
| + Polyacrylic acid | 18 |
| Overbased + polyacrylic acid | 9 |
| Example IX without polyacrylic acid | 70+ |
| + Polyacrylic acid | 42 |
| Overbased + polyacrylic acid | 21 |

As shown in Table III, with Example III 70 ml. of fluid escaped as a wet filtrate without the addition of either polyacrylic acid or overbasing. With the addition of polyacrylic acid, the wet filtrate was reduced to 18 ml. With the addition of polyacrylic acid plus overbasing, the wet filtrate was reduced down to 9 ml. In Example IV, a similar decrease in filtration loss is shown with overbasing plus 3 percent polyacrylic acid in the complex material.

We claim:

1. An additive for use in well operations consisting essentially of: a major portion of petroleum oil; a minor portion of a calcium salt-calcium soap complex ranging from about .25 percent to 15 percent by weight; and a minor portion of a polyacrylic acid ranging from about 0.01 percent to 2.0 percent by weight.

2. An additive in accordance with claim 1 wherein the petroleum oil is a phenol extract of a distillate from a crude oil.

3. An additive in accordance with claim 2 wherein the polyacrylic acid has a molecular weight of at least 200,000.

4. A fracturing fluid consisting essentially of: a hydrocarbon carrier fluid; and an additive ranging from about 0.01 percent to 8.00 percent by volume of the hydrocarbon carrier fluid, said additive including a major portion of petroleum oil, calcium salt-calcium soap complexes ranging from about .25 percent to 15 percent by weight of the additive, and a minor portion of a polyacrylic acid ranging from about 0.01 percent to 2.0 percent by weight of the additive.

5. A fracturing fluid in accordance with claim 4 wherein the petroleum oil is a phenol extract of a distillate from a crude oil.

6. A fracturing fluid in accordance with claim 5 wherein the polyacrylic acid has a molecular weight of at least 200,000.

References Cited by the Examiner

UNITED STATES PATENTS

| | | | |
|---|---|---|---|
| 2,605,225 | 7/52 | Armstrong et al. | 252—40.5 |
| 2,779,735 | 1/57 | Brown et al. | 252—8.55 |
| 3,046,222 | 7/62 | Phansalker et al. | 252—8.55 |
| 3,065,171 | 11/62 | Morrow et al. | 252—8.55 |

JULIUS GREENWALD, *Primary Examiner.*